United States Patent
Ishitsuka

(10) Patent No.: US 10,466,806 B2
(45) Date of Patent: Nov. 5, 2019

(54) ELECTRONIC DEVICE, CONTROL METHOD THEREOF, AND STORAGE MEDIUM

(71) Applicant: CANON KABUSHIKI KAISHA, Tokyo (JP)

(72) Inventor: Yuichiro Ishitsuka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 15/901,537

(22) Filed: Feb. 21, 2018

(65) Prior Publication Data
US 2018/0246582 A1 Aug. 30, 2018

(30) Foreign Application Priority Data
Feb. 27, 2017 (JP) .................. 2017-035109

(51) Int. Cl.
*G06F 3/023* (2006.01)
*H04N 5/232* (2006.01)

(52) U.S. Cl.
CPC ......... *G06F 3/023* (2013.01); *H04N 5/23216* (2013.01); *H04N 5/23293* (2013.01)

(58) Field of Classification Search
CPC . G06F 3/023; H04N 5/23293; H04N 5/23216
See application file for complete search history.

(56) References Cited

U.S. PATENT DOCUMENTS 8,787,745 B2 * 7/2014 Lai .................. G03B 17/08
396/27
2015/0160801 A1 * 6/2015 Holt ................ G06F 3/0482
715/784

FOREIGN PATENT DOCUMENTS

JP 61-235893 A 10/1986
JP H08-16294 A 1/1996

* cited by examiner

*Primary Examiner* — Dmitriy Bolotin
(74) *Attorney, Agent, or Firm* — Canon USA, Inc., IP Division

(57) ABSTRACT

An electronic device includes a control unit configured to perform control, in a first operation mode, to execute first processing in a case where a first detection unit, which is for detecting an operation indicating a first direction, detects an operation, to execute second processing in a case where the second detection unit, which is for detecting an operation indicating a second direction, detects an operation, and to execute third processing in a case where the second detection unit further detects an operation, and in a second operation mode, to execute fourth processing in a case where the first detection unit detects an operation, to execute fifth processing in a case where the second detection unit detects an operation, and to continuously execute the fourth processing in a case where the second detection unit further detects an operation.

22 Claims, 10 Drawing Sheets

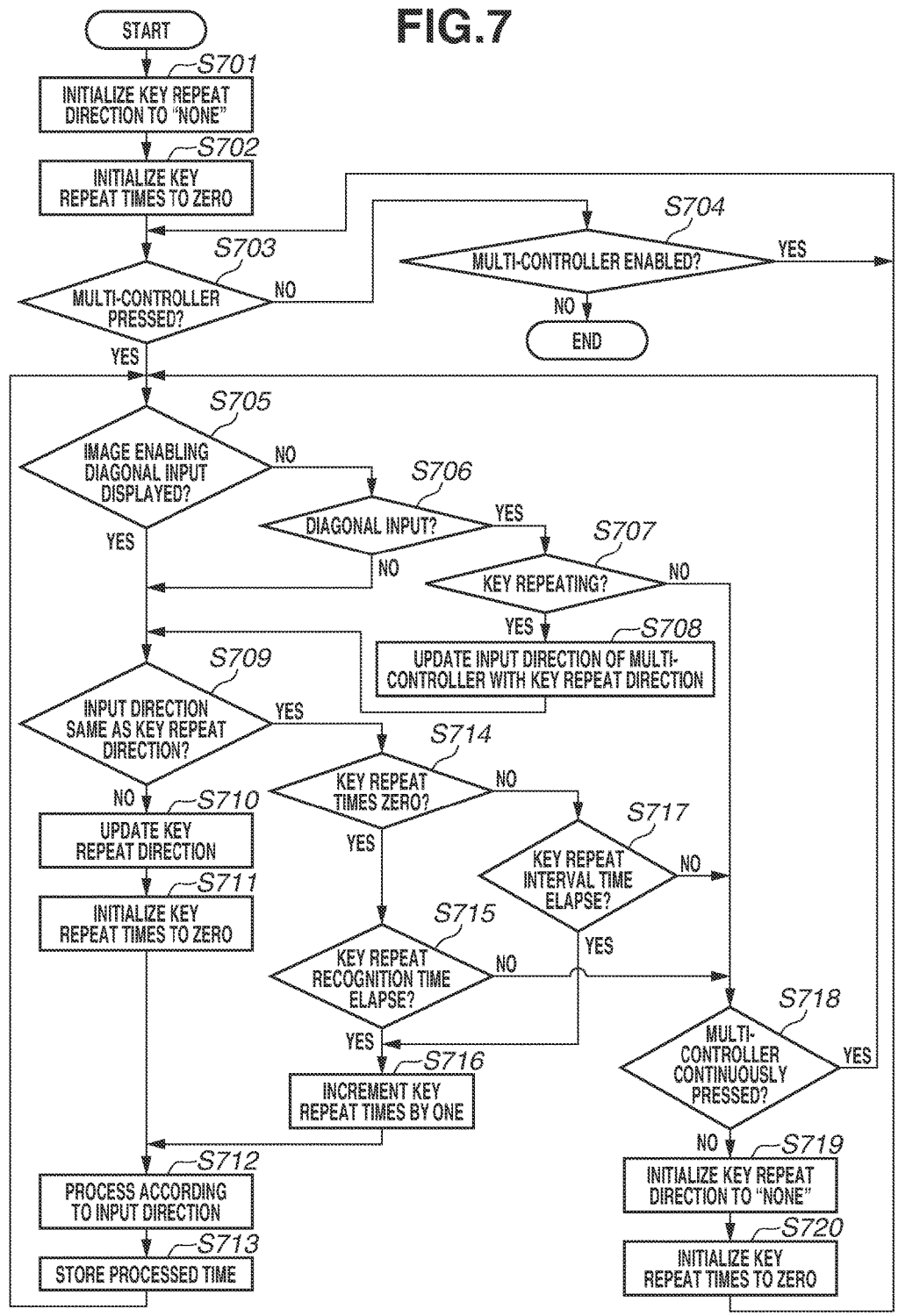

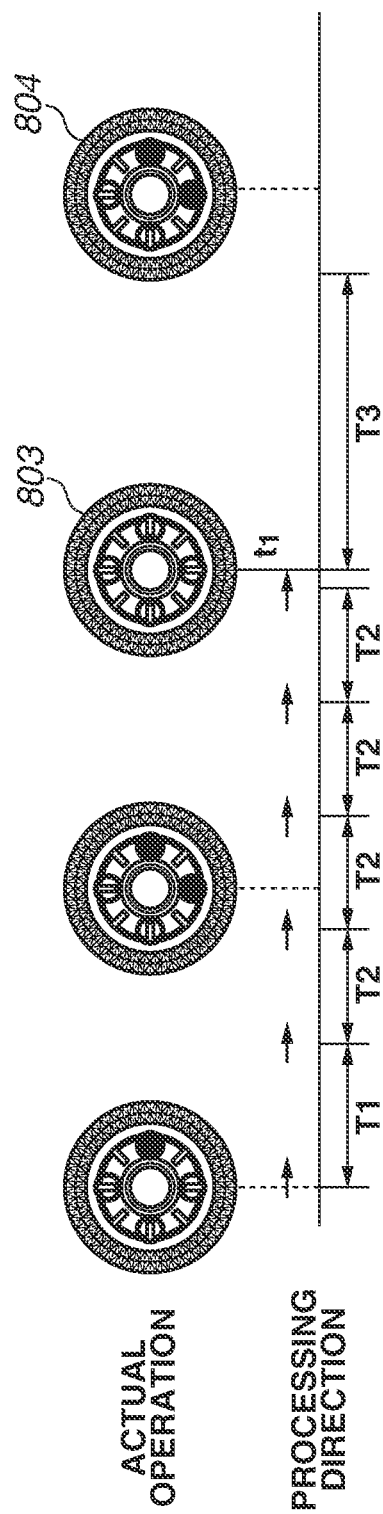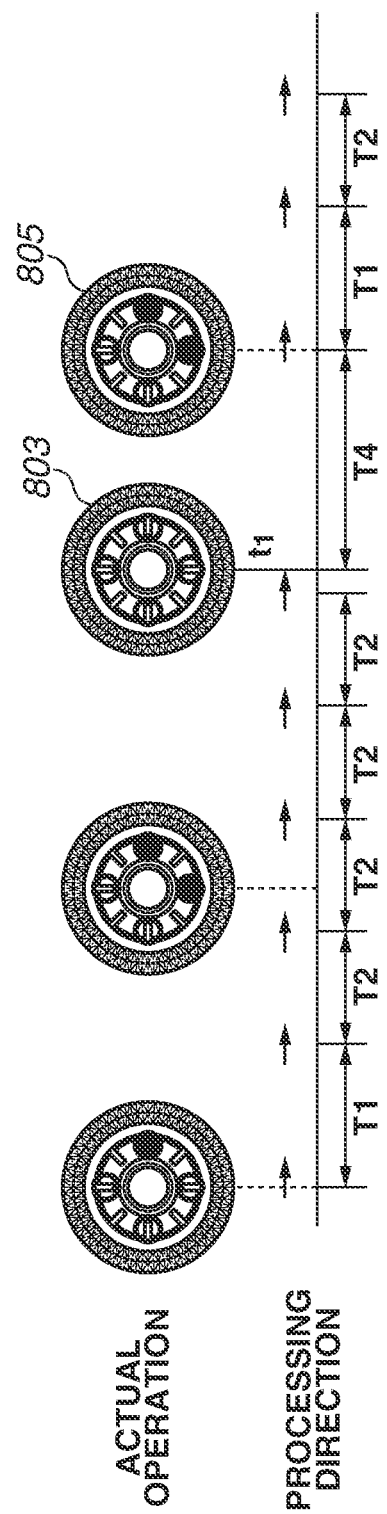

ELECTRONIC DEVICE, CONTROL METHOD THEREOF, AND STORAGE MEDIUM

BACKGROUND

Field of the Disclosure

The present disclosure generally relates to electronics and, more particularly, to an electronic device, a control method thereof, and a storage medium.

Description of the Related Art

There is a conventional technique for recognizing a key input which continues for a certain period of time or longer as a repeat of the key input (Japanese Patent Application Laid-Open No. 8-16294). Thus, maintaining pressing of a key can provide the same effect as that of repeatedly pressing the key, accordingly, usability, for example, when instructing a scroll of a display screen can be improved.

In addition, there is a technique for recognizing simultaneous pressing of a plurality of keys and providing a function corresponding to a combination of the simultaneously pressed keys. Japanese Patent Application Laid-Open No. 61-235893 describes a technique for, when one of keys arranged in a vertical direction and one of keys arranged in a horizontal direction of a housing are simultaneously pressed, recognizing the key inputs as an input in a diagonal direction corresponding to the pressed two keys. According to the conventional technique described in Japanese Patent Application Laid-Open No. 61-235893, an input in the diagonal direction is not always recognized. In addition, the technique does not consider a case when two keys are simultaneously pressed in a state in which an input in the diagonal direction is not recognized. Further, when a user unintentionally presses two keys recognized as a diagonal input in a state in which the diagonal input is recognized, an operation is executed against the user's intention. For example, if a user unintentionally presses an upper direction key or a lower direction key during when maintaining pressing of a right direction key to scroll an image to the right direction, the image is scrolled to the diagonal direction without the user's intention.

SUMMARY

The present disclosure is directed to the provision of an electronic device which can provide an operation matching with an intention of a user if the user performs an unintentional input and a method for controlling the electronic device in consideration of the above-described discussion.

According to one or more aspects of the present disclosure, an electronic device includes a detection unit configured to detect an operation with respect to an operation member for indicating a direction including a first detection unit configured to detect an operation indicating a first direction and a second detection unit configured to detect an operation indicating a second direction, and a control unit configured to perform control, in a first operation mode, to execute first processing in a case where the first detection unit detects an operation while the second detection unit does not detect an operation, to execute second processing in a case where the second detection unit detects an operation while the first detection unit does not detect an operation, and to execute third processing in a case where the second detection unit further detects an operation in a state in which the first detection unit detects an operation and executes the first processing, and in a second operation mode, to execute fourth processing in a case where the first detection unit detects an operation while the second detection unit does not detect an operation, to execute fifth processing in a case where the second detection unit detects an operation while the first detection unit does not detect an operation, and to continuously execute the fourth processing in a case where the second detection unit further detects an operation in a state in which the first detection unit detects an operation and executes the fourth processing.

Further features of the present disclosure will become apparent from the following description of exemplary embodiments with reference to the attached drawings.

BRIEF DESCRIPTION OF THE DRAWINGS

FIG. 7 is a flowchart illustrating an operation with respect to an input to the multi-controller according to the exemplary embodiment.

FIGS. 8A and 8B are schematic diagrams illustrating handling of a detected input direction according to the exemplary embodiment.

DESCRIPTION OF THE EMBODIMENTS

Exemplary embodiments of the present disclosure will be described in detail below with reference to the accompanying drawings.

It is to be noted that the following exemplary embodiments are merely examples for implementing the present disclosure and can be appropriately modified or changed depending on individual constructions and various conditions of apparatuses to which the present disclosure is applied. Thus, the present disclosure is in no way limited to the following exemplary embodiments.

Figure 1A:
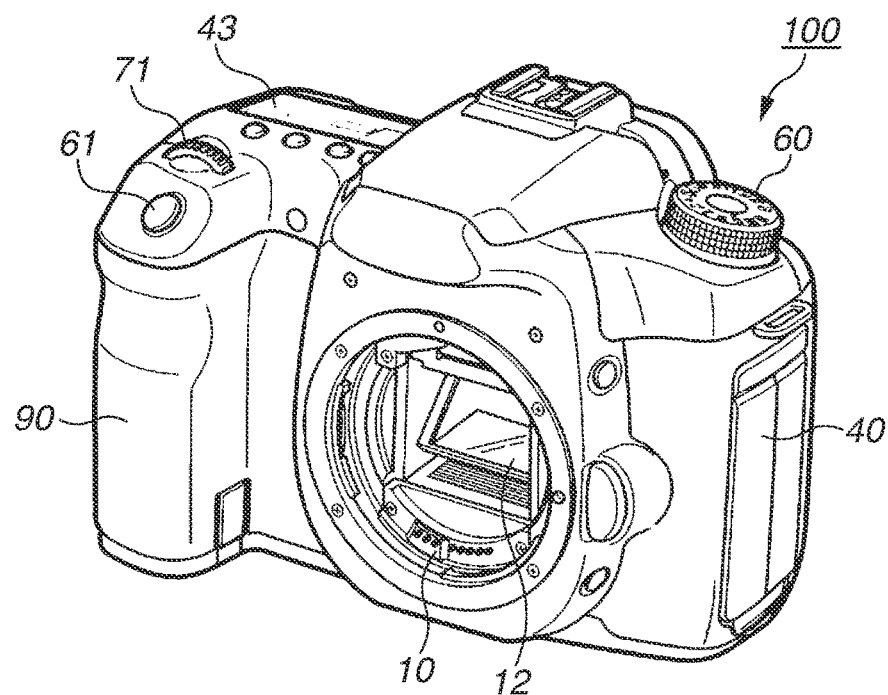
FIGS. 1A and 1B illustrate external appearances of a digital camera.
Figure 1B:
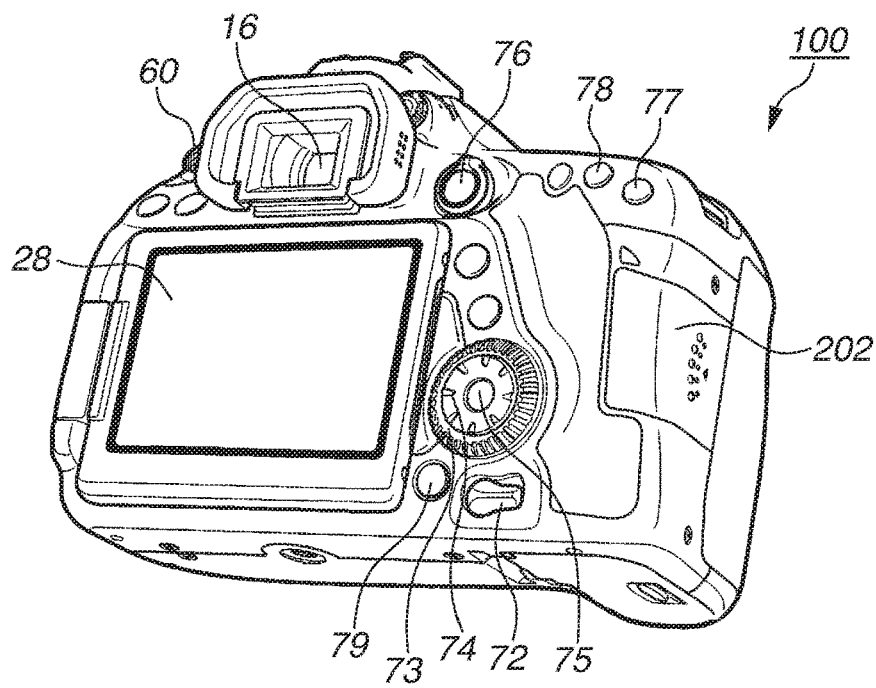

A first exemplary embodiment of the present disclosure will now be described in detail below with reference to the attached drawings. FIGS. 1A and 1B are perspective views of examples of external appearances of a main body of a lens interchangeable type digital camera 100 as an example of an electronic device according to the present disclosure. FIG. 1A is a front face perspective view and FIG. 1B is a rear face perspective view.

A display unit 28 disposed on the rear surface is used to display a captured image, various information pieces of the digital camera 100, a graphical user interface (GUI) screen, and the like. An out-of-finder display unit 43 disposed on an upper surface is used to display various setting values including a shutter speed and an aperture. A shutter button 61 is assigned with a function of inputting an image capturing preparation instruction and an image capturing start instruction. A mode change switch 60 is assigned with a function of switching operation modes of the digital camera 100. A terminal cover 40 protects a connector for connecting a cable for wireline connection to an external apparatus.

A main electronic dial 71 is rotatable and assigned with a function of changing, for example, setting values of the shutter speed and the aperture. In response to a rotational direction and a rotational amount of the main electronic dial 71, the digital camera 100 changes, for example, the setting values of the shutter speed and the aperture. A power switch 72 is assigned with a function of switching ON and OFF of a power source of the digital camera 100. A sub electronic dial 73 is rotatable and assigned with a function of, for example, moving a selection frame and changing an image to be displayed on the display unit 28. In response to a rotational direction and a rotational amount of the sub electronic dial 73, the digital camera 100, for example, moves the selection frame and changes an image to be displayed on the display unit 28.

A multi-controller 74 is an eight-direction key which is disposed inside of the sub electronic dial 73 and can receive an operation for pressing upper, lower, left, right, upper right, lower right, upper left, and lower left portions. The multi-controller 74 may be configured to include individual buttons or switches on pressable eight parts or to include individual buttons or switches on four parts in the vertical and horizontal directions and to detect simultaneous pressing of adjacent two parts as an input of the diagonal direction. In addition, the multi-controller 74 may have a configuration, such as a joy stick, which can recognize an input to an arbitrary direction. The digital camera 100 can execute an operation related to the pressing position of the multi-controller 74, such as when the upper portion of the multi-controller 74 is pressed on a screen in which selectable items are vertically arranged, the selection frame is moved upward.

A SET button 75 disposed on the center of the multi-controller 74 can be pressed and is assigned with a function of mainly instructing determination of a selection item. A live view (LV) button 76 is used to instruct ON and OFF of a live view display on the display unit 28. When the digital camera 100 is operated in a moving image capturing mode, the LV button 76 is assigned with a function of inputting an instruction to start and stop capturing (recording) a moving image.

An enlargement button 77 is assigned with a function of instructing ON and OFF of an enlargement mode of the live view display and instructing to change an enlargement ratio in the enlargement mode when the digital camera 100 is operated in an image capturing mode. When the digital camera 100 is operated in a playback mode, the enlargement button 77 is also assigned with a function of instructing to enlarge a playback image displayed on the display unit 28 and instructing to increase the enlargement ratio.

A reduction button 78 is assigned with a function of reducing a display magnification of a playback image. A playback button 79 is assigned with a function of switching the image capturing mode and the playback mode in the operation modes of the digital camera 100. When the playback button 79 is pressed during the operation in the image capturing mode, the digital camera 100 shifts to the operation in the playback mode and, for example, displays the latest image in images recorded in a the storage medium on the display unit 28.

A quick return mirror 12 is in an illustrated down state when an eyepiece finder 16 is used and in an up state when a live view image or a recording image is captured. A terminal 10 is a terminal for the digital camera 100 to communicate with an interchangeable lens and to supply power to the interchangeable lens. The eyepiece finder 16 is an optical viewfinder for observing an object image formed on an internal focusing screen and checking a focusing degree and a composition. A lid 202 can be opened and closed and protects a slot for attaching a storage medium. A grip portion 90 is formed into a shape for a user to easily hold the digital camera 100.

Figure 2:
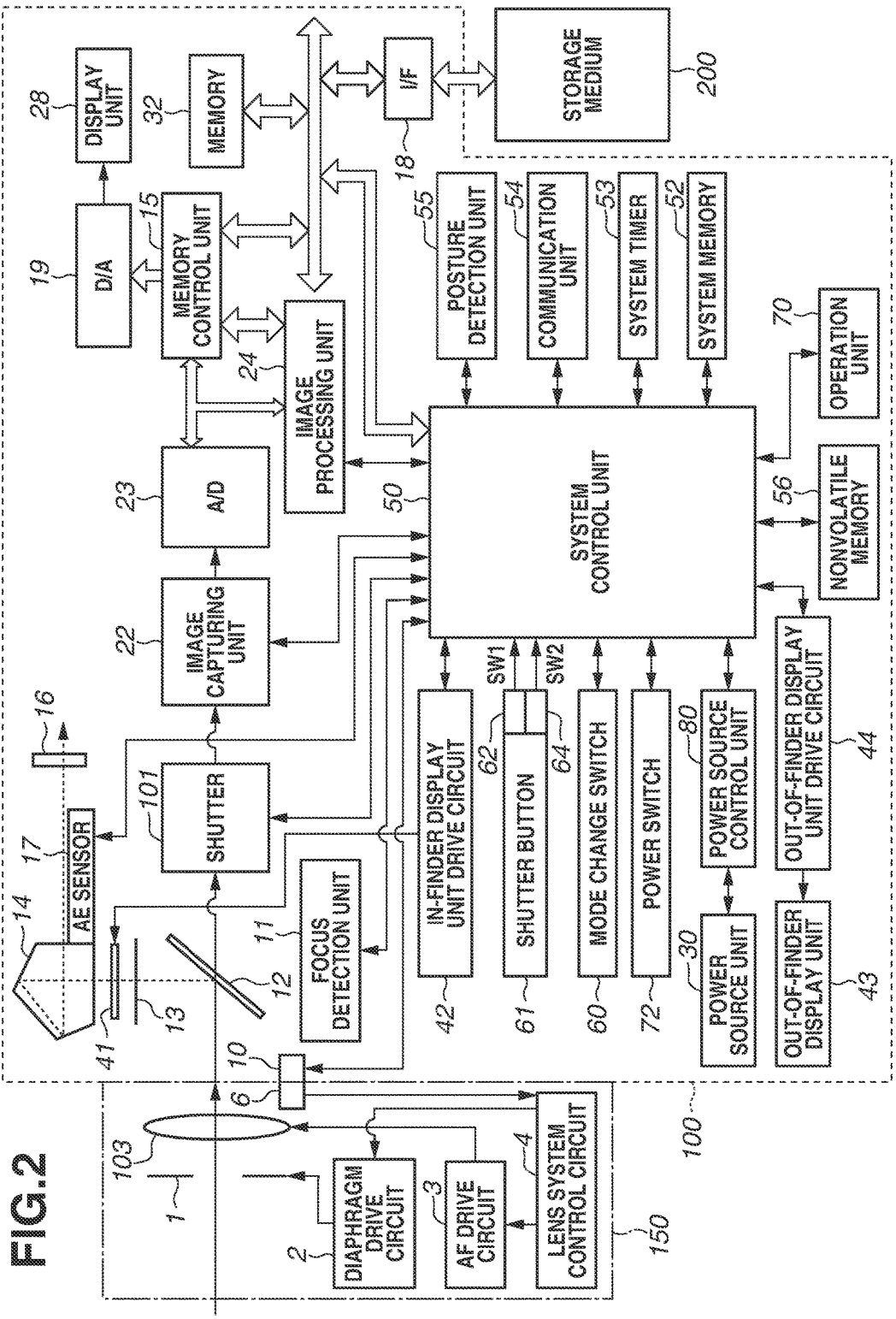
FIG. 2 is a block diagram illustrating an example of a functional configuration of the digital camera and a lens unit.

FIG. 2 is a block diagram illustrating an example of a functional configuration of the digital camera 100, and the same reference numerals are used for the same components as those in FIGS. 1A and 1B. A lens unit 150 (the interchangeable lens) is formed to be detachable from the digital camera 100.

A lens 103 is constituted of a plurality of lenses, however, is illustrated in only one lens by being simplified. The lens 103 includes a focus lens which can move in an optical axis direction. A terminal 6 is brought into contact with the terminal 10 in a state in which the lens unit 150 is mounted on the digital camera 100. The lens unit 150 communicates with the digital camera 100 and receives the power supply from the digital camera 100 via the terminal 6.

A lens system control circuit 4 controls an operation of the lens unit 150 via communication with a system control unit 50. For example, the lens system control circuit 4 controls a diaphragm drive circuit 2 to drive a diaphragm 1 so as to be an aperture value instructed from the system control unit 50. Further, the lens system control circuit 4 controls an automatic focus (AF) drive circuit 3 to drive the focus lens according to an instruction from the system control unit 50 and thus changes a focal distance of the lens 103.

An automatic exposure (AE) sensor 17 measures a luminance and a luminance distribution of an object image formed by the lens unit 150 on the focusing screen.

A focus detection unit 11 receives light transmitted through a half mirror portion provided on a part of the quick return mirror 12 and detects a defocus amount using a phase difference detection system. The system control unit 50 controls a focus lens position of the lens unit 150 based on the defocus amount.

A pentagonal prism 14 refracts light so that an optical image formed on the focusing screen 13 can be observed from the eyepiece finder 16.

A shutter 101 is operated by control by the system control unit 50 and exposes an image capturing unit 22 with the light passing through an aperture of the shutter 101.

The image capturing unit 22 is an image capturing element for converting an optical image into an electrical signal and includes, for example, a charge coupled device (CCD) and a complementary metal oxide semiconductor (CMOS) image sensor. An analog-to-digital (A/D) converter 23 converts an analog image signal read out from the image capturing unit 22 into a digital image signal (image data).

An image processing unit 24 applies processing such as pixel interpolation, white balance adjustment, resizing, and color conversion to the image data from the A/D converter 23 or a memory control unit 15. In addition, the image processing unit 24 calculates an evaluation value from the image data which is used by the system control unit 50 for automatic focus (AF) and automatic exposure (AE) control. The image processing unit 24 further can execute detection of an object (for example, a person's face) area, template matching processing for tracking an object, encoding and decoding processing of the image data, and the like.

The image data output from the A/D converter 23 is stored in a memory 32. The memory 32 stores image data which is captured by the image capturing unit 22 and converted into digital data by the A/D converter 23 and image data to be displayed on the display unit 28. The memory 32 has a storage capacity sufficient to store a predetermined number of still images and a predetermined time length of moving images and sound.

In addition, the memory 32 also functions as a memory for image display (a video memory). A digital-to-analog (D/A) converter 19 converts image data for display stored in the memory 32 into an analog signal and supplies the analog signal to the display unit 28, and thus the image data for display is displayed on the display unit 28. The display unit 28 may be, for example, a liquid crystal display device (LCD) and an organic electroluminescence (EL) display device. A moving image captured by the image capturing unit 22 is virtually displayed in real-time on the display unit 28, so that the live view display of the display unit 28 can be realized.

In an in-finder liquid crystal display unit 41, a mark (an AF frame) indicating an area in which auto focusing is currently performed, a numerical value of a set image capturing condition, an icon, and the like are displayed by an in-finder display unit drive circuit 42.

The out-of-finder display unit 43 displays various setting values of the digital camera 100 including the shutter speed and the aperture via an out-of-finder display unit drive circuit 44.

A nonvolatile memory 56 is an electrically erasable and recordable memory, and, for example, an electrically erasable and programmable read only memory (EEPROM) is used. The nonvolatile memory 56 stores a program executed by a programmable processor included in the system control unit 50, various setting values, constants, GUI data, and the like.

The system control unit 50 may include one or more programmable processors and one or more memories, and may control operations of the digital camera 100 (and the lens unit 150). The programmable processor(s) may execute a program stored in the nonvolatile memory 56, and thus each processing described below can be realized. A system memory 52 reads a constant and a variable for the operation of the system control unit 50 and a program from the nonvolatile memory 56. The system control unit 50 also controls a display operation on the display unit 28. A system timer 53 provides a clock function and a timing function.

A first shutter switch 62 and a second shutter switch 64 are switches respectively turned ON by half-pressing and full-pressing of the shutter button 61. The system control unit 50 recognizes "ON" of the first shutter switch 62 as the image capturing preparation instruction and "ON" of the second shutter switch 64 as the image capturing start instruction and executes operations accordingly.

More specifically, the system control unit 50 starts automatic focus (AF) processing, automatic exposure (AE) processing, automatic white balance (AWB) processing, pre-flash (EF) processing, and the like in response to the image capturing preparation instruction. In addition, the system control unit 50 performs exposure of the image capturing unit 22 based on the aperture value and the shutter speed determined by the AE processing in response to the image capturing start instruction. Subsequently, the system control unit 50 reads a signal from the image capturing unit 22 and executes a series of image capturing processing for recording an image data file storing the image data applied with various image processing by the image processing unit 24 in a storage medium 200.

An operation unit 70 represents input devices as a whole such as a button and a switch which are not independently illustrated in FIG. 2. Excepting a dedicated operation member fixedly assigned with a specific function, such as the shutter button 61, an operation member included in the digital camera 100 is dynamically assigned with a function. Therefore, the same switch and the same button can have a different function depending on the operation mode and an operation state of the digital camera 100.

A power source control unit 80 is constituted of a battery detection circuit, a direct-current to direct-current (DC-DC) converter, a switch circuit for switching energization blocks, and the like and detects loading or not of a battery, a type of the battery, and a battery remaining quantity. Further, the power source control unit 80 controls the DC-DC converter based on the detection result and an instruction from the system control unit 50 and supplies a necessary voltage to a necessary part for a necessary period.

A power source unit 30 includes one or more of a primary battery, a secondary battery, and an alternating current (AC) adapter. A storage medium interface (I/F) 18 is an interface to the storage medium 200 such as a memory card and a hard disk.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Operations on the multi-controller 74 and processing corresponding thereto by the digital camera 100 according to the present exemplary embodiment are described below with reference to FIGS. 3A to 7.

Figure 3A:
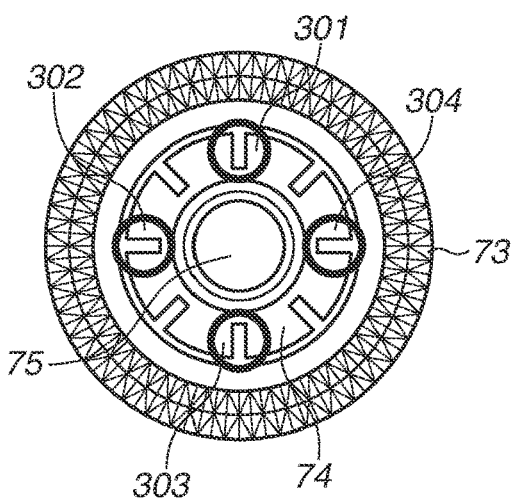
FIGS. 3A to 3E schematically illustrate relationships between an operation on a multi-controller and a detected input according to an exemplary embodiment.

As illustrated in FIG. 3A, the multi-controller 74 includes a hollow disk shaped operation member and four switches 301, 302, 303, and 304 respectively arranged on the upper, right, lower, and left of a back side of the operation member.

The switches 301 to 304 are indirectly pressed by the operation member, and the switches 301 and 303 detect an operation indicating the vertical direction (a first direction) as an input of the first direction. The switches 302 and 304 detect an operation indicating the horizontal direction (a second direction) as an input of the second direction. Further, two switches adjacent to each other in a circumferential direction (for example, the switches 301 and 302) among the switches 301 to 304 detect an operation indicating the diagonal direction (a third direction) as an input of the third direction. In the following description, the operation member is referred to as the multi-controller 74, and an operation pressing a right position of the hollow disk shaped operation member is referred to as an operation pressing the right direction for the sake of convenience. In FIGS. 3A to 3E, white blank circles and circles painted in black representing the switches 301 to 304 respectively indicate a non-pressed state and a pressed state.

Figure 3D:
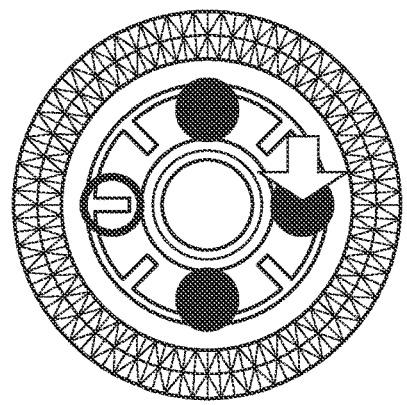
Figure 3B:
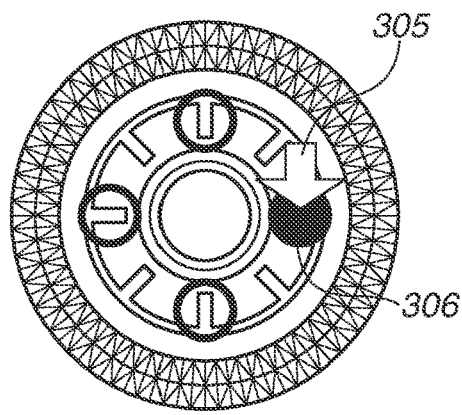

FIG. 3B illustrates a state in which the right direction (a right position) is pressed on the multi-controller 74. An arrow 305 indicates a pressing position on the multi-controller 74. The switch 304 on the back side of the pressing position is changed to a pressed state 306, and the other switches 301 to 303 remain in the non-pressed state. When the upper direction, the lower direction, or a left direction is pressed, the switch 301, 302, or 303 corresponding to the pressing position is similarly changed to the pressed state, and the other switches remain the non-pressed state.

Figure 3E:
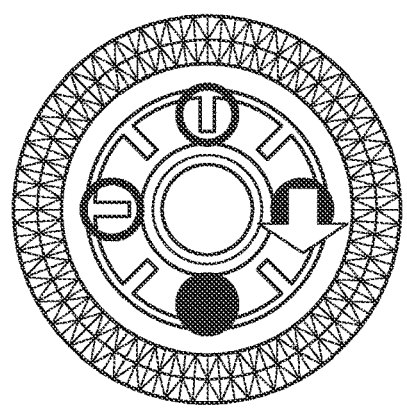
Figure 3C:
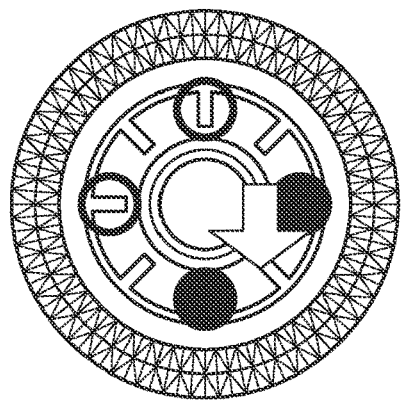

FIG. 3C illustrates a state in which the lower right direction is pressed on the multi-controller 74. There is no switch on the back side of the pressing position, however, the switch 304 and the switch 303 are indirectly pressed by the operation member. In this case, the system control unit 50 determines as an input of the lower right direction. When the upper left direction, the lower left direction, or the upper right direction is pressed on the multi-controller 74, the system control unit 50 similarly determines as an input of the upper left direction, the lower left direction, or the upper right direction. As described above, the multi-controller 74 can detect operations (inputs) in eight directions, i.e., upper, upper right, right, lower right, lower, lower left, left, and upper left directions.

In the following description, an input when two switches adjacent to each other on the circumference are simultaneously pressed in the vertical and horizontal switches is referred to as a diagonal input (or a diagonal direction input). In addition, the operation state in which one or more diagonal inputs are enabled is referred to as a first operation mode, the operation state in which all of the diagonal inputs are disabled is referred to as a second operation mode, and the operation state in which only an operation (input) in the vertical direction or the horizontal direction is enabled is referred to as a third operation mode.

FIG. 3D illustrates a state in which the right direction is pressed hard on the multi-controller 74. Pressing is too hard, so that the switch 303 for detecting the lower direction and the switch 301 for detecting the upper direction are also changed to the pressed state in addition to the switch 304 for detecting the right direction. In this case, the system control unit 50 recognizes as, for example, an input of the lower right direction or the upper right direction depending on which of the switches 301 and 303 is changed to the pressed state first.

FIG. 3E illustrates a state in which a position slightly lower than the right direction is pressed on the multi-controller 74. The switch 303 for detecting the lower direction is also changed to the pressed state in addition to the switch 304 for detecting the right direction. This case may occur, for example, when a user operates the digital camera 100 while looking down, and when the pressing position is shifted while continuously maintaining pressing of the right direction. In the case where such a situation occurs when a user tries to press the right direction, an input of the lower right direction is performed which is different from the intention of the user.

FIGS. 4A to 4F illustrate setting screens for white balance correction (white balance shift) as examples of screens displayed in the first operation mode on which the diagonal direction input is enabled (eight-direction inputs are enabled).

FIGS. 4A to 4F illustrate displays before changing setting values. A setting value 401 is on the center of the graph, and values 402 indicate correction amounts from the current setting values. Correction is not performed here, and thus the correction amounts are zero both in the horizontal direction and the vertical direction. In the following description, a change in the screen display in response to an operation on the multi-controller 74 is realized by the system control unit 50 changing, for example, the image data for display in the memory 32.

Figure 4A:
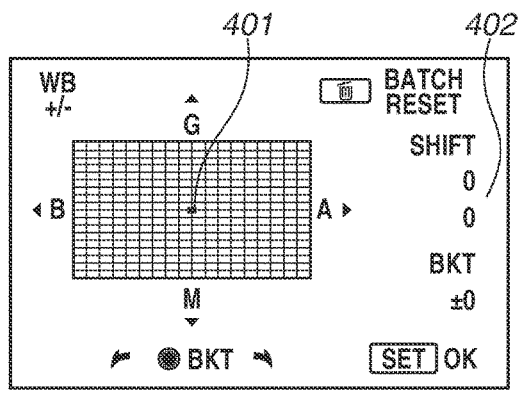
FIGS. 4A to 4F illustrate examples of screens on which eight-direction inputs in vertical, horizontal, and diagonal directions are enabled.
Figure 4D:
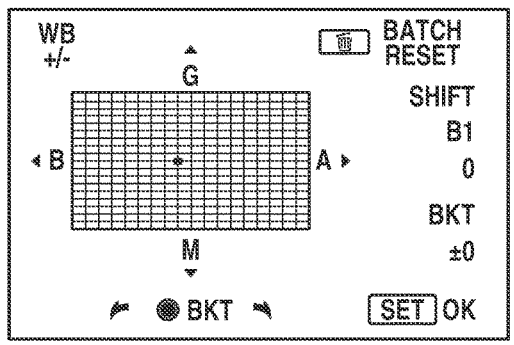
Figure 4B:
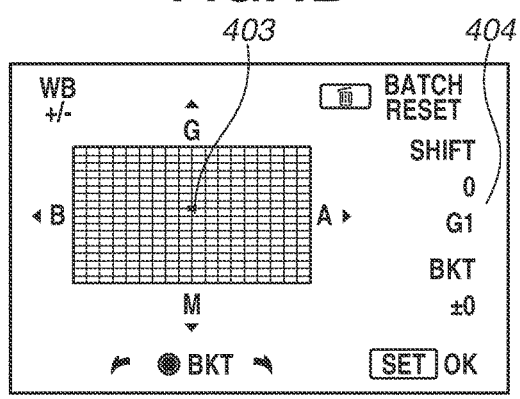

FIG. 4B illustrates a state in which the system control unit 50 moves a setting value 403 by one scale from the center of the graph to the upper direction (a green (G) direction) in response to detection of the upper direction input on the multi-controller 74 in the state of FIG. 4A. Regarding values 404, one of the horizontal direction remains zero and the other on the vertical direction changes to G1.

Figure 4E:
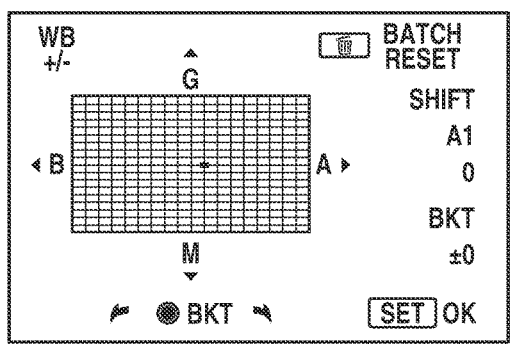
Figure 4C:
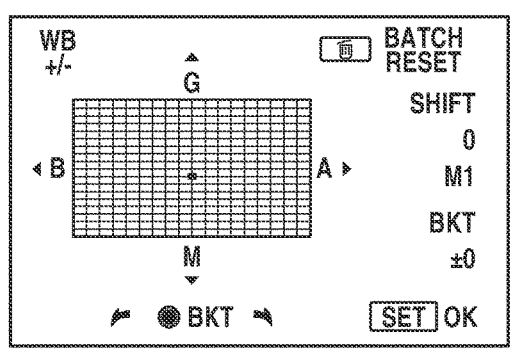

FIG. 4C illustrates a state in which the system control unit 50 moves the setting value 403 by one scale from the center of the graph to the lower direction (a magenta (M) direction) in response to detection of the lower direction input on the multi-controller 74 in the state of FIG. 4A. The value of the horizontal direction remains zero, and the value of the vertical direction is changed to Ml.

As illustrated in FIGS. 4B and 4C, the system control unit 50 performs first processing (processing for moving the setting value 403 up or down) when detecting the operation on the switches 301 and 303 without detecting the operation on the switches 302 and 304.

FIG. 4D illustrates a state in which the system control unit 50 moves the setting value 403 by one scale from the center of the graph to the left direction (a blue (B) direction) in response to detection of the left direction input on the multi-controller 74 in the state of FIG. 4A. The value of the horizontal direction is changed to B1, and the value of the vertical direction remains zero.

FIG. 4E illustrates a state in which the system control unit 50 moves the setting value 403 by one scale from the center of the graph to the right direction (an amber (A) direction) in response to detection of the right direction input on the multi-controller 74 in the state of FIG. 4A. The value of the horizontal direction is changed to A1, and the value of the vertical direction remains zero.

As illustrated in FIGS. 4D and 4E, the system control unit 50 performs second processing (processing for moving the setting value 403 to right and left) when detecting the operation on the switches 302 and 304 without detecting the operation on the switches 301 and 303.

Figure 4F:
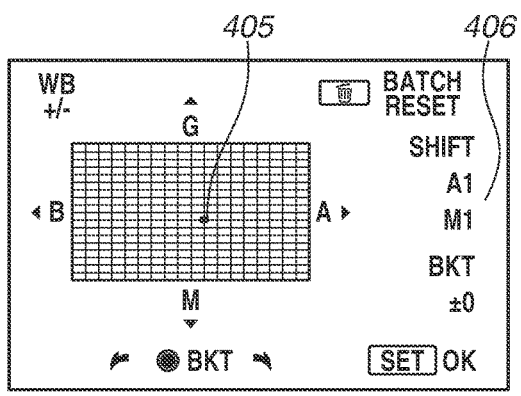

FIG. 4F illustrates a state in which the system control unit 50 moves the setting value 403 by one scale each to the lower right direction, namely the amber and magenta directions from the center of the graph in response to detection of the lower right direction input on the multi-controller 74 in the state of FIG. 4A. The value of the horizontal direction and the value of the vertical direction are respectively changed to A1 and Ml. Display examples when the upper left direction, the lower left direction, and the upper right direction are pressed on the multi-controller 74 are omitted.

As illustrated in FIG. 4F, the system control unit 50 performs third processing (processing for moving the setting value 403 to the diagonal direction) when simultaneously detecting the operations on one of the switches 301 and 303 and one of the switches 302 and 304.

As described above, when the diagonal input is enabled, processing corresponding to the diagonal input is executed when the diagonal input is detected. Accordingly, processing different from that of when the diagonal input is disabled can be executed.

FIGS. 5A to 5F illustrate menu screens as examples of screens displayed in the second operation mode on which the diagonal input (vertical and horizontal four-direction inputs are enabled excepting the diagonal direction) is disabled. In the menu screen, the horizontal direction input is assigned to a function of switching a tab and changing the setting value, and the vertical direction input is assigned to a function of moving the selection frame (focus), however, the diagonal input is not assigned to a specific function.

Figure 5A:
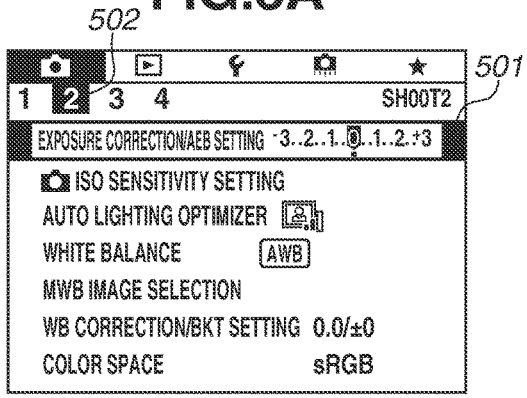
FIGS. 5A to 5F illustrate examples of screens on which four-direction inputs in the vertical and horizontal directions excepting the diagonal directions are disabled.

FIG. 5A illustrates a state in which a second tab 502 is selected in four tabs. A focus 501 is in a state in which a first item is selected in seven items.

Figure 5D:
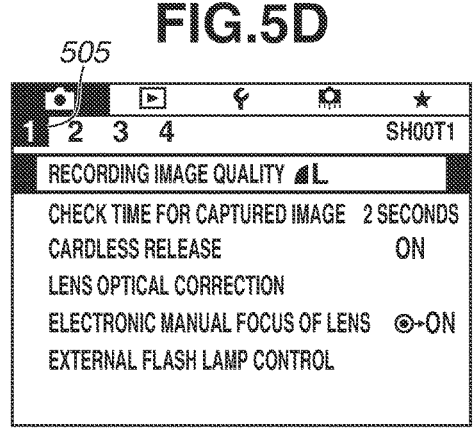
Figure 5B:
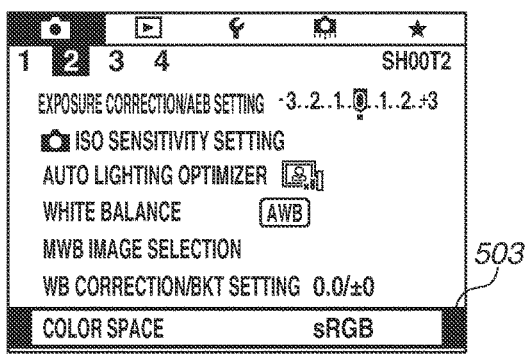

FIG. 5B illustrates a state in which the upper direction input is detected on the multi-controller 74 in the state in FIG. 5A, and the focus 501 is moved one item to the upper direction and selects a seventh item. According to the present exemplary embodiment, one item above the first item is the seventh item, and one item below the seventh item is the first item. The state that the tab 502 is selected is not changed.

Figure 5E:
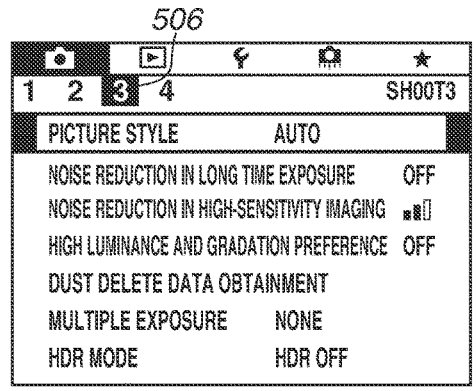
Figure 5C:
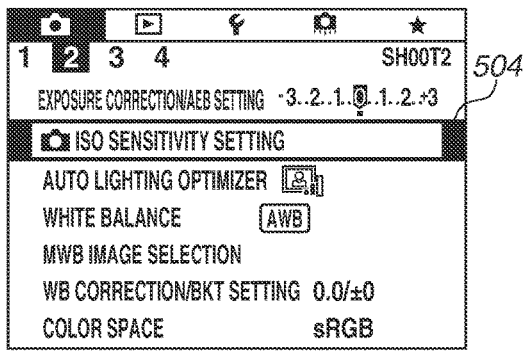

FIG. 5C illustrates a state in which the lower direction input is detected on the multi-controller 74 in the state in FIG. 5A, and a focus 504 is moved one item to the lower direction and selects a second item. The state that the tab 502 is selected is not changed.

As illustrated in FIGS. 5B and 5C, the system control unit 50 performs fourth processing (processing for moving the focus 504 up and down) when detecting the operation on the switches 301 and 303 without detecting the operation on the switches 302 and 304.

FIG. 5D illustrates a state in which the left direction input is detected on the multi-controller 74 in the state in FIG. 5A, and the selected tab is changed from the second tab 502 to a first tab 505. When the tab is switched, the focus is displayed at a position stored with respect to the switched tab.

FIG. 5E illustrates a state in which the right direction input is detected on the multi-controller 74 in the state in FIG. 5A, and the selected tab is changed from the second tab 502 to a third tab 506.

As illustrated in FIGS. 5D and 5E, the system control unit 50 performs fifth processing (tab switching processing) when detecting the operation on the switches 302 and 304 without detecting the operation on the switches 301 and 303.

Figure 5F:
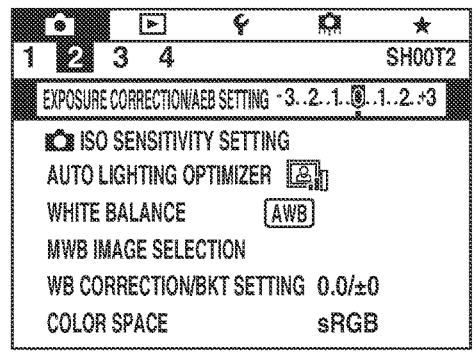

FIG. 5F is a display example when the lower right direction input is detected on the multi-controller 74 in the state in FIG. 5A. The diagonal input is disabled (or is not recognized) on the menu screen, and thus the focus 501 and the selected tab 502 are not changed. When the upper left direction input, the lower left direction input, and the upper right direction input are detected on the multi-controller 74, the display is not changed in the same way.

FIGS. 6A to 6D schematically illustrate relationships between operation directions of the multi-controller 74 and input directions recognized by the digital camera 100. A time 601 for the system control unit 50 recognizes a key repeat of the multi-controller 74 is expressed as T1 (a first time), and a timing when recognizing a new key input after recognizing the key repeat (a key repeat interval 602) is expressed as T2 (a second time). As an example, it is regarded as T1=500 msec, and T2=130 msec. In addition, a state after recognizing the key repeat (after elapse of the time T1) is referred to as duration of the key repeat.

Figure 6A:
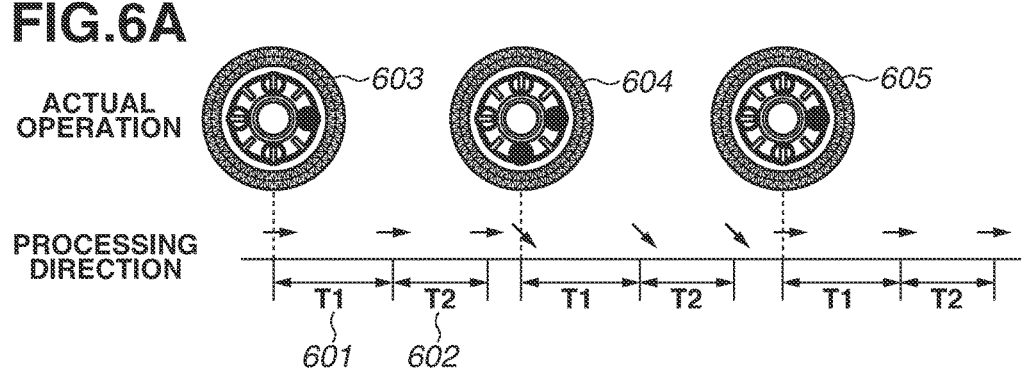
FIGS. 6A to 6D are schematic diagrams illustrating handling of a detected input direction according to the exemplary embodiment.

FIG. 6A schematically illustrates a case in which the diagonal input is enabled, and processing is performed according to the input direction of the multi-controller 74. When a right input 603 is detected on the multi-controller 74, and the same input is continued for the time T1, the system control unit 50 recognizes as the key repeat and detects the second right input at that time point. Then, the system control unit 50 detects the right input for every time the right input is continued for the time T2. Therefore, the system control unit 50 executes the processing according to the direction of the key repeat for every time T2 during recognizing the key repeat.

When a lower right input 604 is detected on the multi-controller 74, the system control unit 50 releases the recognition of the key repeat of the right input. When the lower right input is continued for the time T1, the system control unit 50 detects the second the lower right input and recognizes as the key repeat. When the lower right input is continued for the time T2 as it is, the system control unit 50 detects the third lower right input. Then, when a right input 605 is detected on the multi-controller 74, the system control unit 50 releases the recognition of the key repeat of the lower right input. When the right input is continued for the time T1, the system control unit 50 detects the second right input and recognizes as the key repeat. When the right input is continued for the time T2 as it is, the system control unit 50 detects the third right input.

Figure 6B:
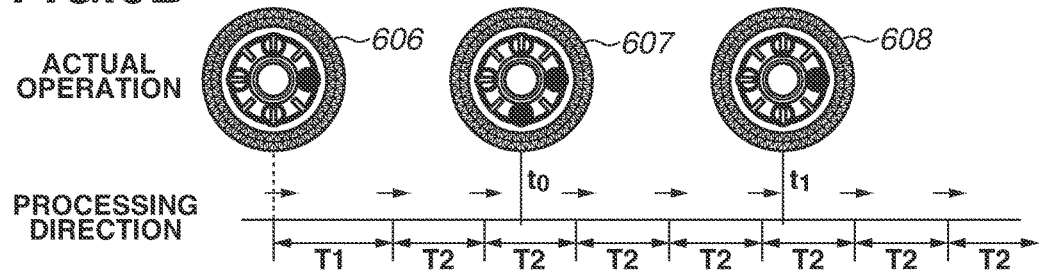

FIG. 6B illustrates processing when the diagonal input is not enabled in a similar manner to that in FIG. 6A.

Similar to FIG. 6A, a right input 606 is continuously detected on the multi-controller 74, and the system control unit 50 recognizes as the key repeat of the right input. Subsequently, the lower right input 607 is detected on the multi-controller 74 at the time t0, however, the system control unit 50 continuously recognizes as the key repeat of the right input and does not perform processing corresponding to the lower right input. This is because there is no need to execute processing corresponding to the diagonal input, for example, on a screen in which the diagonal input is disabled as in FIG. 5F. Further, it is because, it is highly likely that the diagonal input is due to a shift of the pressing position or increase of pressing force while the right direction on the multi-controller 74 is continuously pressed as described with reference to FIGS. 3D and 3E. In other words, it is highly likely to match with an intention of a user to continue the recognition of the key repeat of the right input. Subsequently, when the input of the multi-controller 74 is changed from the lower right direction to the right direction at a time t1, the system control unit 50 continuously recognizes as the key repeat of the right input.

Figure 6C:
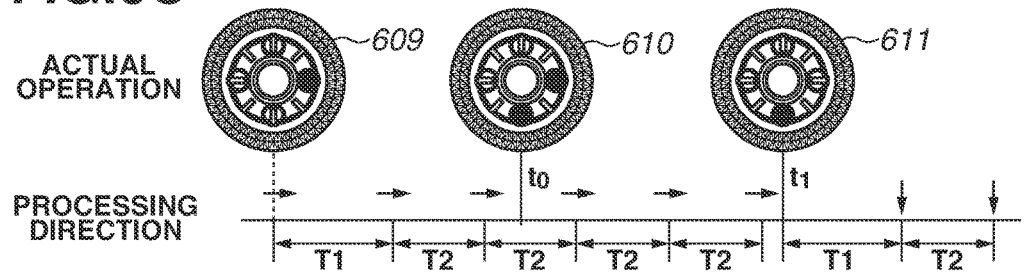

On the other hand, when an input which is different from that of the key repeat processing and in an enable direction is detected at the time t1 in FIG. 6B, the system control unit 50 detects an input in a newly detected direction (the lower direction here) as illustrated in FIG. 6C. It is highly likely that a change from the right input to the lower input is intended by a user. Thus, the system control unit 50 executes processing corresponding to the lower input. Subsequently, when the lower input is continued for the time T1, the system control unit 50 detects a second lower input and recognizes as the key repeat. Subsequently, when the lower input is continuously detected for the time T2, the system control unit 50 detects a third lower input.

Figure 6D:
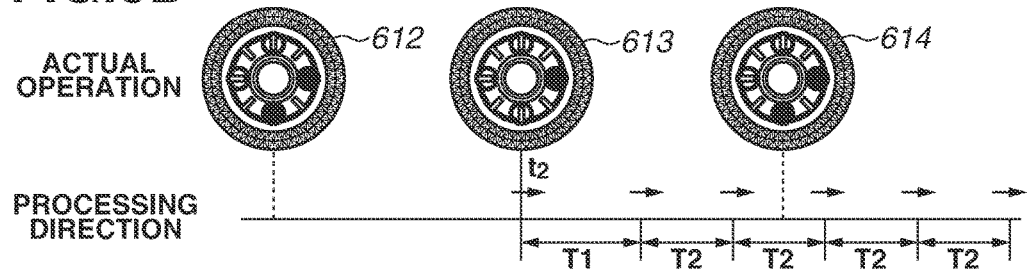

When an input firstly detected in a state in which the diagonal input is disabled is the diagonal input (a lower right input 612) as illustrated in FIG. 6D, the system control unit 50 does not execute processing corresponding to the operation on the multi-controller 74 until an input in an enable direction is detected. When a direction of a detected input is changed from the lower right to the right at a time t2, the system control unit 50 executes the processing as illustrated in FIG. 6B from that time point.

FIG. 7 is a flowchart illustrating processing of the system control unit 50 corresponding to the operations on the multi-controller 74 described with reference to FIGS. 6A to 6D. The processing is realized by a programmable processor of the system control unit 50 loading and executing a program stored in the nonvolatile memory 56 in the system memory 52.

In step S701, the system control unit 50 initializes, for example, information indicating a key repeat direction stored in the system memory 52 to "none" and advances the processing to step S702.

In step S702, the system control unit 50 initializes, for example, the number of the key repeat times stored in the system memory 52 to zero and advances the processing to step S703.

In step S703, the system control unit 50 determines whether the multi-controller 74 is pressed (one or more of the switches 301 to 304 is ON). The system control unit 50 advances the processing to step S705 when determining as pressed (YES in step S703) and advances the processing to step S704 when not determining as pressed (NO in step S703).

In step S704, the system control unit 50 determines whether a screen in which the operation of the multi-controller 74 is enabled is displayed on the display unit 28. The system control unit 50 advances the processing to step S703 when determining that the screen in which the operation of the multi-controller 74 is enabled is displayed (YES in step S704) and terminates the processing when not determining that the screen in which the operation of the multi-controller 74 is enabled is displayed. Whether the display screen is the one in which the operation of the multi-controller 74 is enabled can be determined by, for example, referring to attribute information of screen data being displayed, however, other methods can be used.

In step S705, the system control unit 50 determines whether a screen being displayed on the display unit 28 is a screen in which the eight-direction input (the diagonal input) is enabled. When determining that the screen in which the diagonal input on the multi-controller 74 is enabled is displayed (YES in step S705), the system control unit 50 advances the processing to step S709, and when not determining that the screen in which the diagonal input on the multi-controller 74 is enabled is displayed (NO in step S705), the system control unit 50 advances the processing to step S706. Whether the display screen is the one in which the diagonal input on the multi-controller 74 is enabled can be determined by, for example, referring to the attribute information of the screen data being displayed, however, other methods can be used. The display screen in which the diagonal input is enabled is, for example, the setting screen of the white balance correction illustrated in FIGS. 4A to 4F, and the display screen in which the diagonal input is disabled is, for example, the menu screen illustrated in FIGS. 5A to 5F, however, the display screen is not limited to them.

In step S706, the system control unit 50 determines whether the diagonal direction is input from the multi-controller 74 (namely, a state in which adjacent two or more switches in the switches 301 to 304 are ON at the same time). When determining that the diagonal direction is input (YES in step S706), the system control unit 50 advances the processing to step S707, and when not determining that the diagonal direction is input (a state in which only one of the switches 301 to 304 is ON, NO in step S706), the system control unit 50 advances the processing to step S709.

In step S707, the system control unit 50 determines whether the key repeat by continuous pressing on the multi-controller 74 is being recognized (the key is repeating). The system control unit 50 advances the processing to step S708 when determining that the key is repeating (YES in step S707) and advances the processing to step S718 when not determining so (NO in step S707). According to the present exemplary embodiment, the system control unit 50 determines that the key is repeating when the information indicating the key repeat direction exists in the system memory 52 and determines that the key is not repeating when the information indicating the key repeat direction does not exist (when "none" is stored). However, other methods may be used for determination.

In step S708, the system control unit 50 updates (rewrites) an operation direction of the multi-controller detected based on ON/OFF states of the switches 301 to 304 with the key repeat direction and advances the processing to step S709. In other words, when the diagonal input is detected in the state in which the diagonal input is disabled, the system control unit 50 determines that the key repeat direction is detected when the key is repeating. The processing corresponds to the processing from the time t0 to the time t1 in FIG. 6B.

In step S709, the system control unit 50 determines whether the input direction of the multi-controller 74 is the same as the key repeat direction. The system control unit 50 advances the processing to step S714 when determining as the same (YES in step S709) and advances the processing to step S710 when not determining as the same (NO in step S709). When the processing proceeds from step S708 to step S709, it is determined as the same in step S709 without fail.

In step S710, the system control unit 50 updates the key repeat direction with the input direction of the multi-controller 74 and advances the processing to step S711. The processing in step S710 is executed, for example, when the input on the multi-controller 74 is changed to the lower direction (only the switch 302 is ON) during the key repeat of the input of the lower right direction (the switches 302 and 304 are ON) on the multi-controller 74 on the screen in which the diagonal input is enabled. Alternatively, the processing in step S710 is executed when the input is changed to the lower direction (only the switch 302 is ON) in the state in which the input on the lower right direction (the switches 302 and 304 are ON) on the multi-controller 74 is handled as the right direction input and also the key is repeating on the screen in which the diagonal input is disabled. In this case, the system control unit 50 once releases the recognition of the key repeat even if the input on the multi-controller 74 is not interrupted (if a user does not release his/her finger from the multi-controller 74) and handles as that the lower direction is newly input.

In step S711, the system control unit 50 initializes the number of the key repeat times stored in the system memory 52 to zero and advances the processing to step S712.

In step S712, the system control unit 50 executes processing corresponding to the input direction of the multi-controller 74 (the updated key repeat direction in the case of the processing via step S708) and advances the processing to step S713.

In step S713, the system control unit 50 stores the time at which the processing is executed in step S712 in the system memory 52 and returns the processing to step S705.

In step S714, the system control unit 50 determines whether the number of the key repeat times stored in the system memory 52 is zero. The system control unit 50 advances the processing to step S715 when determining as zero (the key repeat is not recognized, YES in step S714) and advances the processing to step S717 when not determining as zero (the key repeat is being recognized, NO in step S714).

In step S715, the system control unit 50 determines whether the time T1 for recognizing the key repeat elapsed from the time stored in the system memory 52 at which the processing in step S712 was executed most recently. The system control unit 50 advances the processing to step S716 when determining that the time T1 elapsed (YES in step S715) and advances the processing to step S718 when not determining that the time T1 elapsed (NO in step S715).

In step S716, the system control unit 50 increments the number of the key repeat times stored in the system memory 52 by one and advances the processing to step S712. Accordingly, the processing same as the previous processing is repeatedly executed in step S712.

In step S717, the system control unit 50 determines whether a key repeat interval T2 (<T1) elapsed from the time stored in the system memory 52 at which the processing in step S712 was executed most recently. The system control unit 50 advances the processing to step S716 when determining that the key repeat interval T2 elapsed (YES in step S717) and advances the processing to step S718 when not determining that the key repeat interval T2 elapsed (NO in step S717).

In step S718, the system control unit 50 determines whether the pressing (input) of the multi-controller 74 is continued. The system control unit 50 advances the processing to step S705 when determining that the pressing is continued (YES in step S718) and advances the processing to step S719 when not determining that the pressing is continued (NO in step S718). The system control unit 50 determines that the input is continued when one or more of the switches 301 to 304 are ON and does not determine that the input is continued when all of the switches 301 to 304 are OFF.

In step S719, the system control unit 50 initializes the key repeat direction stored in the system memory 52 to "none" and advances the processing to step S720.

In step S720, the system control unit 50 initializes the number of the key repeat times to zero and returns the processing to step S703.

According to the above-described processing, the processing corresponding to the input diagonal direction is executed in the screen in which the diagonal input is enabled. The key repeat is also recognized in the diagonal direction. However, on the screen in which the diagonal input is disabled, when the diagonal input is firstly detected (NO in step S707), the processing corresponding to the input is not executed. In addition, if the diagonal input is continued as it is, the key repeat is not recognized. However, when the diagonal input is detected during the key repeat of the input to any one of vertical and horizontal directions (YES in step S707), the key repeat is continued.

In FIG. 7, the detected input direction is updated with the key repeat direction which is different from the detected direction in step S708 so as not to execute the processing corresponding to the diagonal direction, however, the diagonal input itself may not be detected. More specifically, when it is determined that the diagonal direction is input in step S706, the input other than the detected direction (namely, any one of the vertical and horizontal directions) may not be detected. Detection in all directions including the diagonal direction is resumed when it is not determined that the pressing of the multi-controller 74 is continued in step S718. At that time, the multi-controller 74 is in a state in which there is no input from any direction or there is an input in a direction different from a specific direction to be determined to be detected.

A second exemplary embodiment according to the present disclosure is described with reference to FIGS. 8A and 8B. According to the first exemplary embodiment, if an input (a first input) when a state in which the pressing of the multi-controller 74 is not detected is changed to the one in which the pressing is detected is in the diagonal direction, the processing corresponding to the input is not executed (FIG. 6D). In contrast, according to the present exemplary embodiment, when a specific condition is satisfied, the processing is executed even if a first input is in the diagonal direction.

FIGS. 8A and 8B schematically illustrate how the apparatus recognizes the detected input direction of the multi-controller 74 and executes the processing. FIGS. 8A and 8B illustrate a case when an input direction firstly detected is the lower right from a state in which an input on the multi-controller 74 is not detected (the switches 301 to 304 are all OFF), however, the same can be applied to the upper right direction.

In FIGS. 8A and 8B, lengths of elapsed times T3 and T4 from when the pressing on the multi-controller 74 is not detected to when the input in the lower right direction is detected are different (T3>T4). In addition, a threshold value satisfying T3>threshold value T4 is preliminarily set.

In FIGS. 8A and 8B, the operations and the processing of the system control unit 50 until when the pressing on the multi-controller 74 is not detected at the time t1 are the same as those according to the first exemplary embodiment described with reference to FIG. 6B. In other words, FIGS. 8A and 8B are the same until the input to the multi-controller 74 is not detected at the time t1 in the state in which the system control unit 50 recognizes the key repeat of the right direction input.

According to the present exemplary embodiment, when an elapsed time from the time t1 is less than the above-described threshold value (less than a predetermined time), and an input 805 is in a direction including the key repeat direction recognized until the time t1 (the upper right or the lower right here), the system control unit 50 processes the input as a new input in the key repeat direction (FIG. 8B). However, when the elapsed time from the time t1 is greater than or equal to the threshold value (greater than or equal to the predetermined time), the system control unit 50 performs the processing similar to that according to the first exemplary embodiment. In other words, even if an input 804 is in a direction including the key repeat direction recognized until the time t1, the system control unit 50 does not execute any processing similar to the diagonal input in the other directions (FIG. 8A).

For example, if a user stops the key repeat, but the key repeat is actually not sufficient, the user needs to input in the same direction again. In this case, it is inconvenient if the input is not received when the user performs the operation same as the key repeat immediately before. Thus, according to the present exemplary embodiment, when the elapsed time from the time t1 is less than the threshold value, the system control unit 50 recognizes as an re-input and handles as an input in the same direction as the key repeat immediately before.

Figure 9A:
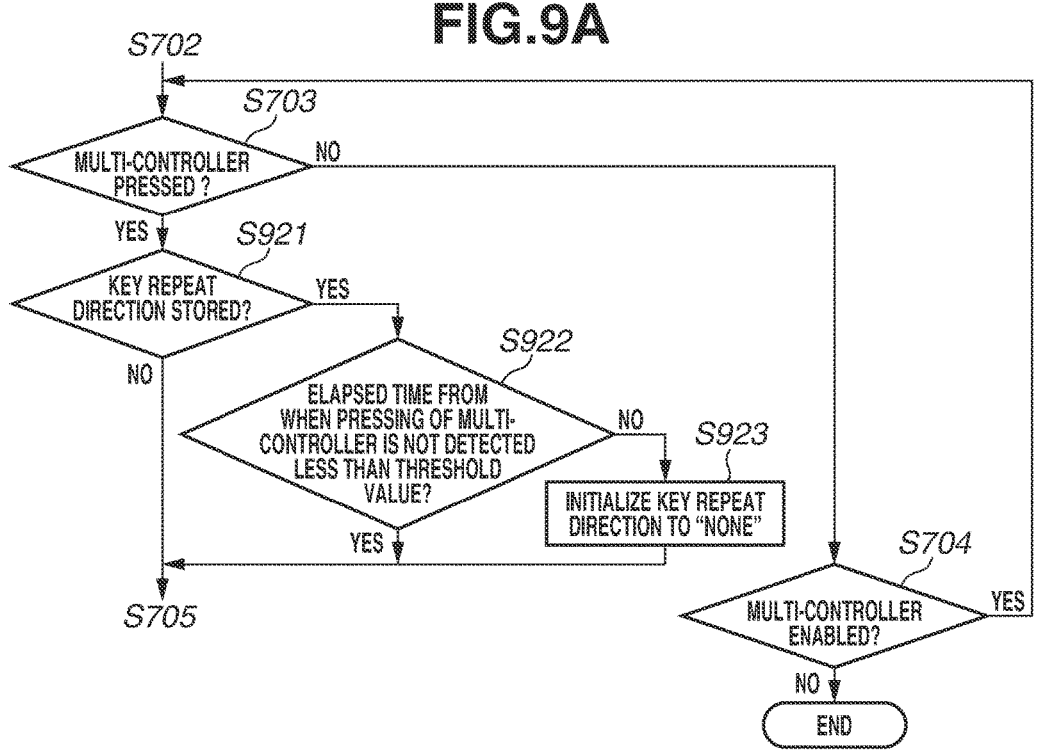
FIGS. 9A and 9B are flowcharts illustrating an operation with respect to an input to the multi-controller according to other exemplary embodiments.

FIG. 9A is a flowchart for realizing operations according to the above-described present exemplary embodiment and mainly illustrating a part of processing changed from that in FIG. 7. The processing the same as that in FIG. 7 is denoted by the same reference numeral, and overlapping descriptions are omitted. More specifically, the processing content in step S719 is changed, and processing in steps S921 to S923 is added between steps S703 and S705.

In step S719, the system control unit 50 stores a time at which the input to the multi-controller 74 is not detected in the system memory 52 instead of initializing the key repeat direction and advances the processing to step S720.

In step S921, the system control unit 50 determines whether the key repeat direction is stored when the pressing on the multi-controller 74 is detected in step S703. The system control unit 50 advances the processing to step S922 when determining that the key repeat direction is stored (YES in step S921) and advances the processing to step S705 when not determining that the key repeat direction is stored (NO in step S921).

In step S922, the system control unit 50 determines whether an elapsed time from when the pressing on the multi-controller 74 is not detected is less than the above-described threshold value time. The system control unit 50 advances the processing to S705 when determining that the elapsed time is less than the threshold value time (YES in step S922) and advances the processing to step S923 when not determining that the elapsed time is less than the threshold value time (NO in step S922).

In step S923, the system control unit 50 initializes the key repeat direction to "none" and advances the processing to step S705.

Next, a third exemplary embodiment according to the present disclosure is described. The present exemplary embodiment is similar to the second exemplary embodiment at the point in which processing is executed when a specific condition is satisfied even if a first input is in the diagonal direction, however, is directed to a situation (a third operation mode) in which only an input in the vertical or the horizontal direction is enabled.

Figure 10A:
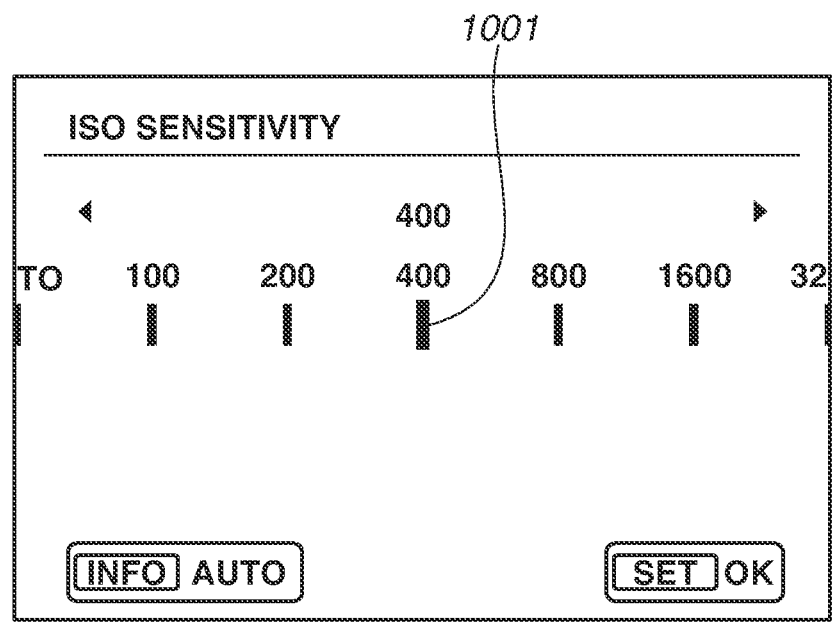
FIGS. 10A and 10B illustrate examples of screens on which two-direction inputs in the vertical direction or the horizontal direction excepting the diagonal directions are enabled.

FIG. 10A illustrates an example of an image capturing sensitivity setting screen as an example of a screen in which a focus 1001 can be changed only in the horizontal direction. The focus 1001 for specifying a sensitivity to be set cannot be moved in the vertical direction. In such a situation, the system control unit 50 can process inputs in the upper left direction and the lower left direction as inputs in the left direction and process inputs in the upper right direction and the lower right direction as inputs in the right direction.

Figure 10B:
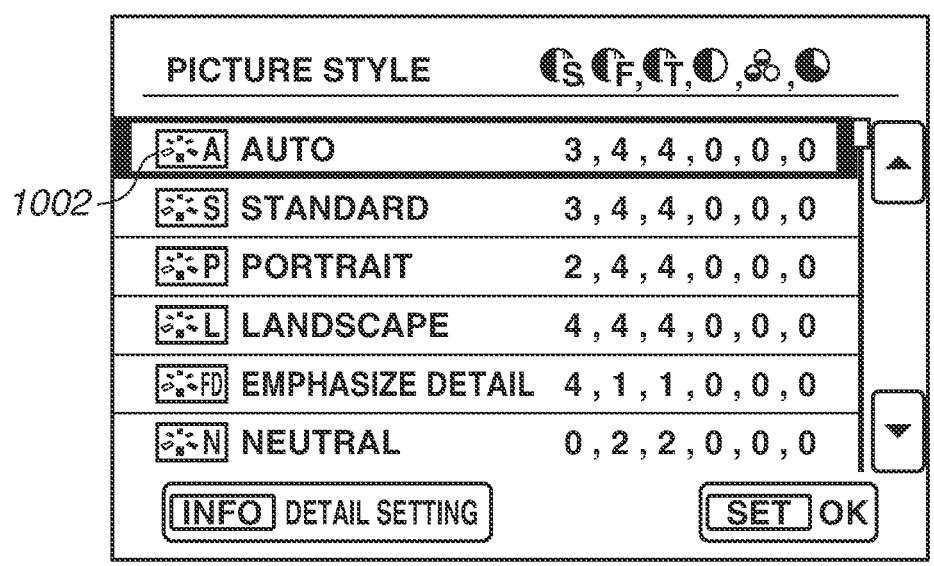

FIG. 10B illustrates an example of a picture style setting screen as an example of a screen in which a focus 1002 can be changed only in the vertical direction. The focus 1002 for specifying an item to be set cannot be moved in the horizontal direction. In such a situation, the system control unit 50 can process inputs in the upper left direction and the upper right direction as inputs in the upper direction and process inputs in the lower left direction and the lower right direction as inputs in the lower direction.

As described above, when an input in the diagonal direction is detected in a situation in which only an input in the vertical or the horizontal direction is enabled, the system control unit 50 according to the present exemplary embodiment handles the input as an input of a direction component in which the input is enabled in a horizontal or a vertical component of the diagonal direction.

Figure 9B:
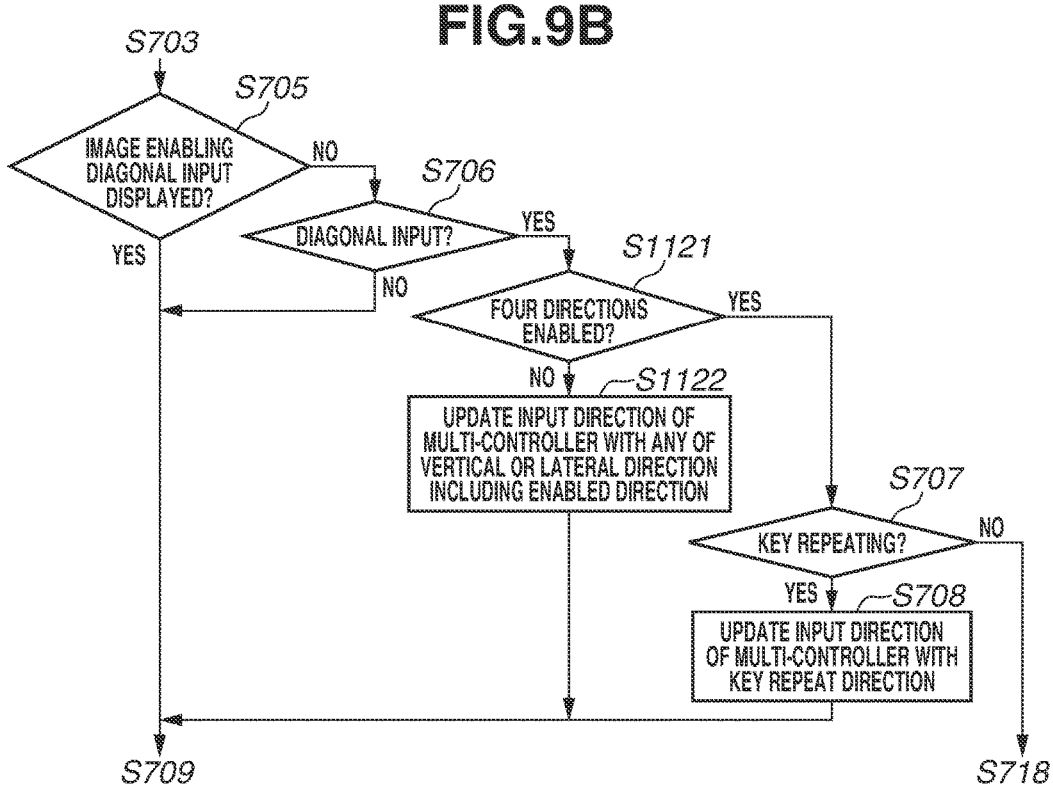

FIG. 9B is a flowchart for realizing operations according to the above-described present exemplary embodiment and mainly illustrating a part of processing changed from that in FIG. 7. The processing same as that in FIG. 7 is denoted by the same reference numeral, and overlapping descriptions are omitted.

More specifically, when the diagonal input is detected in the state in which the diagonal input is disabled (YES in step S706), in step S1121, the system control unit 50 determines whether the four-direction inputs in the vertical and the horizontal directions are enabled. When it is determined that the four-direction inputs are enabled (YES in step S1121), the processing proceeds to step S707, and when it is not determined that the four-direction inputs are enabled (NO in step S1121), the processing proceeds to step S1122. A case which is not determined that the four-direction inputs are not enabled is, for example, when only two-direction inputs in the vertical or the horizontal direction are enabled.

In step S1122, the system control unit 50 updates the input direction detected on the multi-controller 74 with one of the currently enabled input directions and advances the processing to step S709. More specifically, when the currently enabled input direction is the horizontal direction, the system control unit 50 updates an input in the upper right or the lower right direction as an input in the right direction and updates an input in the upper left or the lower left direction as an input in the left direction. Further, when the currently enabled input direction is the vertical direction, the system control unit 50 updates an input in the upper right or the upper left direction as an input in the upper direction and updates an input in the lower right or the lower left direction as an input in the lower direction.

According to the present exemplary embodiment, even if a user unintentionally input in the diagonal direction in the situation in which an input is enabled only in any direction of the horizontal direction (right and left) or the vertical direction (upper and lower), a chance of realizing an operation according to an original intention of the user can be increased Further, according to the present exemplary embodiment, when the diagonal direction is input not only after recognition of the key repeat but from a state in which there is no input, the operation corresponding to the input can be executed, and thus usability is improved.

The control and the operations described using the system control unit 50 as an operation entity may be implemented by one hardware or may be implemented by a plurality of hardware components sharing the processing.

According to the above-described exemplary embodiments, the configuration is described which detects an input or an operation in a first direction (for example, the horizontal direction), a second direction (for example, the vertical direction) perpendicular to the first direction, and a third direction (for example, the diagonal direction) which is 45 degrees different from the first or the second direction. However, for example, the diagonal direction may be an arbitrary direction which is less than 90 degrees different from the first or the second direction. Further, according to the above-described exemplary embodiments, the configuration is described in which a hollow disk shaped operation member covering the four switches 301 to 304 is used as the single multi-controller 74 which can detect the eight-direction inputs. However, an electronic device including an input device in which the switches 301 to 304 are arranged in an exposed state and a plurality of switches can be directly and simultaneously pressed with a finger can implement each of the above-described exemplary embodiments.

The present disclosure is described based on the various exemplary embodiments, however, the present disclosure is not limited to these specific exemplary embodiments and includes various exemplary embodiment without departing from the scope of the disclosure. Further, each of the above-described exemplary embodiments represents one exemplary embodiment of the present disclosure and can be appropriately combined with each other.

The above-described exemplary embodiments are described using the example when the present disclosure is applied to a lens interchangeable type digital camera. However, the present disclosure can be applied to an arbitrary electronic device including a plurality of input devices which can indicate specific directions different from each other. In this regard, the plurality of input devices may be physically provided or may be provided as needed like, for example, a software key.

The above-described electronic device includes an image capturing apparatus, a personal computer, a personal digital assistant (PDA), a mobile phone (including a smartphone), an image viewer, a printer apparatus including a display, a digital photo frame, a media player, and a game machine. Further, the electronic device includes an electronic book reader, a tablet terminal, a projection apparatus, a home electrical appliance including a display, and an onboard apparatus such as a car navigation device, however, is not limited to them.

According to the present disclosure, an electronic device which can provide an operation matching with an intention of a user if the user performs an unintentional input and a method for controlling the electronic device can be provided.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-035109, filed Feb. 27, 2017, which is hereby incorporated by reference herein in its entirety.

What is claimed is:

1. An electronic device comprising:
a detection unit configured to detect an operation with respect to an operation member for indicating a direction including a first detection unit configured to detect an operation indicating a first direction and a second detection unit configured to detect an operation indicating a second direction; and
a memory and at least one processor which function as:
a control unit configured to perform control,
in a first operation mode,
to execute first processing in a case where the first detection unit detects an operation while the second detection unit does not detect an operation,
to execute second processing in a case where the second detection unit detects an operation while the first detection unit does not detect an operation, and
to execute third processing in a case where the second detection unit further detects an operation in a state in which the first detection unit detects an operation and executes the first processing, and
in a second operation mode,
to execute fourth processing in a case where the first detection unit detects an operation while the second detection unit does not detect an operation,
to execute fifth processing in a case where the second detection unit detects an operation while the first detection unit does not detect an operation, and
to continuously execute the fourth processing in a case where the second detection unit further detects an operation in a state in which the first detection unit detects an operation and executes the fourth processing.

2. The electronic device according to claim 1, wherein,
the control unit performs control,
in the first operation mode,
to execute the third processing in a case where the first detection unit further detects an operation in a state in which the second detection unit detects an operation and executes the second processing, and
in the second operation mode,
to continuously execute the fifth processing in a case where the first detection unit further detects an operation in a state in which the second detection unit detects an operation and executes the fifth processing.

3. The electronic device according to claim 1, wherein,
the control unit performs control,
in the first operation mode,
when a first time elapses while the first detection unit keeps detecting an operation, to repeatedly execute the first processing every second time which is shorter than the first time for a period during which the first detection unit continuously detects the operation, to stop repetition of the first processing for every second time in a case where the second detection unit detects an operation in the relevant state, and when the first time elapses while the first detection unit and the second detection unit keep detecting operations, to repeatedly execute the third processing every second time for a period during which the first detection unit and the second detection unit continuously detect the operations, and in the second operation mode, when the first time elapses while the first detection unit keeps detecting an operation, to repeatedly execute the fourth processing every second time for a period during which the first detection unit continuously detects the operation and to continue repetition of the fourth processing for every second time even in a case where the second detection unit further detects an operation in the relevant state.

4. The electronic device according to claim 1, wherein, the control unit performs control, in the first operation mode, to execute the third processing in a case where the first detection unit and the second detection unit respectively detect operations from a state in which either of the first detection unit and the second detection unit do not detect operations, and in the second operation mode, not to execute processing in a case where the first detection unit and the second detection unit respectively detect operations from a state in which either of the first detection unit and the second detection unit do not detect operations.

5. The electronic device according to claim 1, wherein, the control unit performs control, in the first operation mode, to execute the third processing in a case where the first detection unit and the second detection unit respectively detect operations from a state in which either of the first detection unit and the second detection unit do not detect operations, and in the second operation mode, not to execute processing when a predetermined time or more elapses from when the fourth processing or the fifth processing is previously executed in a case where the first detection unit and the second detection unit respectively detect operations from a state in which either of the first detection unit and the second detection unit do not detect operations and to execute the fourth processing or the fifth processing previously executed in a case where less than the predetermined time elapses from when the fourth processing or the fifth processing is previously executed.

6. The electronic device according to claim 1, wherein, the control unit performs control, in the first operation mode, to execute the third processing in a case where the first detection unit and the second detection unit respectively detect operations from a state in which either of the first detection unit and the second detection unit do not detect operations, and in a third operation mode, to execute specific processing in a case where the first detection unit detects an operation while the second detection unit does not detect an operation, not to execute processing corresponding to an operation in a case where the second detection unit detects an operation while the first detection unit does not detect an operation, and to execute the specific processing in a case where the first detection unit and the second detection unit respectively detect operations from a state in which either of the first detection unit and the second detection unit do not detect operations.

7. The electronic device according to claim 1, wherein the electronic device is capable of receiving an operation indicating at least eight directions in upper, upper right, right, lower right, lower, lower left, left, and upper left directions, and the first direction and the second direction are any of two directions perpendicular to each other in the upper, right, lower, and left directions included in the eight directions.

8. The electronic device according to claim 7, further comprising a single operation member configured to receive an operation indicating the at least eight directions.

9. The electronic device according to claim 1, wherein,
the first operation mode is an operation mode in which an operation indicating at least one direction in upper right, lower right, lower left, and upper left directions is enabled, and
the second operation mode is an operation mode in which an operation indicating the upper right, lower right, lower left, and upper left directions is disabled.

10. The electronic device according to claim 1, wherein the electronic device is an image capturing apparatus including an image capturing unit.

11. An electronic device comprising:
a detection unit configured to detect a first operation for indicating a first direction,
a second operation for indicating a second direction perpendicular to the first direction, and
a third operation for indicating a third direction which is less than 90 degrees different from the first direction and the second direction; and
a memory and at least one processor which function as:
a control unit configured to perform control, in a first operation mode,
to execute first processing in response to the first operation,
to execute second processing in response to the second operation, and
to execute third processing in response to detecting the third operation in a state in which the first processing is executed in response to the first operation, and
in a second operation mode,
to execute fourth processing in response to the first operation,
to execute fifth processing in response to the second operation, and
to continuously execute the fourth processing in a case where the third operation is detected in a state in which the fourth processing is executed in response to the first operation.

12. The electronic device according to claim 11, wherein, the control unit performs control, in the first operation mode, when a first time elapses while the first operation is continued, to repeatedly execute the first processing every second time which is shorter than the first time for a period during which the first operation is continued, to stop repetition of the first processing for every second time in a case where the third operation is detected in the relevant state, and when the first time elapses while the third processing is continuously detected, to repeatedly execute the third processing every second time for a period during which the third operation is continued, and in the second operation mode, when the first time elapses while the first processing is continuously detected, to repeatedly execute the fourth processing every second time for a period during which the first operation is continued and to continue repetition of the fourth processing for every second time even in a case where the third operation is detected in the relevant state.

13. The electronic device according to claim 11, wherein, the control unit performs control,
in the first operation mode,
to execute the third processing in a case where the third operation is detected from a state in which neither the first operation nor the second operation is detected, and
in the second operation mode,
not to execute processing corresponding to the third operation in a case where the third operation is detected from a state in which neither the first operation nor the second operation is detected.

14. The electronic device according to claim 11, wherein, the control unit performs control,
in the first operation mode,
to execute the third processing in a case where the third operation is detected from a state in which neither the first operation nor the second operation is detected, and
in the second operation mode,
not to execute processing corresponding to the third operation when a predetermined time or more elapses from when the fourth processing or the fifth processing is previously executed in a case where the third operation is detected from a state in which neither the first operation nor the second operation is detected and to execute the fourth processing or the fifth processing previously executed in a case where less than the predetermined time elapses from when the fourth processing or the fifth processing is previously executed.

15. The electronic device according to claim 11, wherein, the control unit performs control,
in the first operation mode,
to execute the third processing in a case where the third operation is detected from a state in which neither the first operation nor the second operation is detected, and
in a third operation mode,
to execute specific processing in response to the first operation,
not to execute processing corresponding to the second operation even if the second operation is performed, and
to execute the specific processing in response to the third operation.

16. An electronic device comprising:
a detection unit configured to detect a first operation for indicating a first direction,
a second operation for indicating a second direction perpendicular to the first direction, and
a third operation for indicating a third direction which is less than 90 degrees different from the first direction and the second direction; and
a memory and at least one processor which function as:
a control unit configured to perform control to execute fourth processing in response to the first operation,
to execute fifth processing in response to the second operation, and
to continuously execute the fourth processing in a case where the third operation is detected in a state in which the fourth processing is executed in response to the first operation.

17. A method for controlling an electronic device including a detection unit configured to detect an operation with respect to an operation member for indicating a direction, wherein the detection unit includes a first detection unit configured to detect an operation indicating a first direction and a second detection unit configured to detect an operation indicating a second direction,
the method comprising:
performing control, in a first operation mode,
to execute first processing in a case where the first detection unit detects an operation while the second detection unit does not detect an operation,
to execute second processing in a case where the second detection unit detects an operation while the first detection unit does not detect an operation, and
to execute third processing in a case where the second detection unit further detects an operation in a state in which the first detection unit detects an operation and executes the first processing; and
performing control, in a second operation mode,
to execute fourth processing in a case where the first detection unit detects an operation while the second detection unit does not detect an operation,
to execute fifth processing in a case where the second detection unit detects an operation while the first detection unit does not detect an operation, and to continuously execute the fourth processing in a case where the second detection unit further detects an operation in a state in which the first detection unit detects an operation and executes the fourth processing.

18. A method for controlling an electronic device including a detection unit configured to detect a first operation for indicating a first direction,
a second operation for indicating a second direction perpendicular to the first direction, and
a third operation for indicating a third direction which is less than 90 degrees different from the first direction and the second direction, the method comprising:
performing control, in a first operation mode,
to execute first processing in response to the first operation,
to execute second processing in response to the second operation, and
to execute third processing in response to detecting the third operation in a state in which the first processing is executed in response to the first operation; and
performing control, in a second operation mode,
to execute fourth processing in response to the first operation,
to execute fifth processing in response to the second operation, and
to continuously execute the fourth processing even in a case where the third operation is detected in a state in which the fourth processing is executed in response to the first operation.

19. A method for controlling an electronic device including a detection unit configured to detect a first operation for indicating a first direction, a second operation for indicating a second direction perpendicular to the first direction, and a third operation for indicating a third direction which is less than 90 degrees different from the first direction and the second direction, the method comprising:
executing fourth processing in response to the first operation;
executing fifth processing in response to the second operation; and performing control to continuously execute the fourth processing even in a case where the third operation is detected in a state in which the fourth processing is executed in response to the first operation.

20. A non-transitory computer-readable storage medium storing a program for causing a computer to execute a method for controlling an electronic device including a detection unit configured to detect an operation with respect to an operation member for indicating a direction, wherein the detection unit includes a first detection unit configured to detect an operation indicating a first direction and a second detection unit configured to detect an operation indicating a second direction, the method comprising:
performing control, in a first operation mode,
to execute first processing in a case where the first detection unit detects an operation while the second detection unit does not detect an operation,
to execute second processing in a case where the second detection unit detects an operation while the first detection unit does not detect an operation, and
to execute third processing in a case where the second detection unit further detects an operation in a state in which the first detection unit detects an operation and executes the first processing; and
performing control, in a second operation mode,
to execute fourth processing in a case where the first detection unit detects an operation while the second detection unit does not detect an operation,
to execute fifth processing in a case where the second detection unit detects an operation while the first detection unit does not detect an operation, and
to continuously execute the fourth processing in a case where the second detection unit further detects an operation in a state in which the first detection unit detects an operation and executes the fourth processing.

21. A non-transitory computer-readable storage medium storing a program for causing a computer to execute a method for controlling an electronic device including a detection unit configured to detect a first operation for indicating a first direction, a second operation for indicating a second direction perpendicular to the first direction, and
a third operation for indicating a third direction which is less than 90 degrees different from the first direction and the second direction, the method comprising:
performing control, in a first operation mode,
to execute first processing in response to the first operation,
to execute second processing in response to the second operation, and
to execute third processing in response to detecting the third operation in a state in which the first processing is executed in response to the first operation; and
performing control, in a second operation mode,
to execute fourth processing in response to the first operation,
to execute fifth processing in response to the second operation, and
to continuously execute the fourth processing even in a case where the third operation is detected in a state in which the fourth processing is executed in response to the first operation.

22. A non-transitory computer-readable storage medium storing a program for causing a computer to execute a method for controlling an electronic device including a detection unit configured to detect a first operation for indicating a first direction, a second operation for indicating a second direction perpendicular to the first direction, and a third operation for indicating a third direction which is less than 90 degrees different from the first direction and the second direction, the method comprising:
executing fourth processing in response to the first operation;
executing fifth processing in response to the second operation; and
performing control to continuously execute the fourth processing even in a case where the third operation is detected in a state in which the fourth processing is executed in response to the first operation.

* * * * *